United States Patent
Frank et al.

(10) Patent No.: US 6,922,757 B2
(45) Date of Patent: Jul. 26, 2005

(54) FLEXIBLE AND ADAPTIVE READ AND WRITE STORAGE SYSTEM ARCHITECTURE

(75) Inventors: Shahar Frank, Ramat Hasharon (IL); Nir Peleg, Beer Yaacov (IL); Menachem Rosin, Rehovot (IL)

(73) Assignee: Exanet Inc., Santa Clara, CA (US)

( * ) Notice: Subject to any disclaimer, the term of this patent is extended or adjusted under 35 U.S.C. 154(b) by 372 days.

(21) Appl. No.: 10/265,778

(22) Filed: Oct. 8, 2002

(65) Prior Publication Data

US 2003/0159006 A1 Aug. 21, 2003

Related U.S. Application Data

(60) Provisional application No. 60/356,770, filed on Feb. 15, 2002.

(51) Int. Cl.$^7$ .............................................. G06F 12/02
(52) U.S. Cl. ....................................... 711/147; 711/156
(58) Field of Search .................... 711/147, 119, 711/120, 148, 118, 113, 156; 709/214, 229

(56) References Cited

U.S. PATENT DOCUMENTS

| | | |
|---|---|---|
| 4,897,781 A | 1/1990 | Chang et al. |
| 5,113,519 A | 5/1992 | Johnson et al. |
| 5,163,131 A | 11/1992 | Row et al. |
| 5,355,453 A | 10/1994 | Row et al. |
| 5,594,918 A | 1/1997 | Knowles et al. |
| 5,644,751 A | 7/1997 | Burnett |
| 5,689,706 A | 11/1997 | Rao et al. |
| 5,802,366 A | 9/1998 | Row et al. |
| 5,835,942 A | 11/1998 | Putzolu |
| 5,893,140 A | 4/1999 | Vahalia et al. |
| 5,918,229 A | 6/1999 | Davis et al. |
| 5,931,918 A | 8/1999 | Row et al. |
| 5,948,062 A * | 9/1999 | Tzelnic et al. ............... 709/219 |
| 5,963,963 A | 10/1999 | Schmuck et al. |
| 5,978,843 A | 11/1999 | Wu et al. |
| 6,061,720 A | 5/2000 | Kamel et al. |
| 6,119,151 A | 9/2000 | Cantrell et al. |
| 6,125,388 A | 9/2000 | Reisman |
| 6,192,408 B1 * | 2/2001 | Vahalia et al. ............... 709/229 |
| 6,247,077 B1 | 6/2001 | Muller et al. |
| 6,260,040 B1 | 7/2001 | Kauffman et al. |
| 6,330,572 B1 | 12/2001 | Sitka |
| 6,782,389 B1 * | 8/2004 | Chrin et al. ................... 707/10 |
| 2002/0078239 A1 * | 6/2002 | Howard et al. ............ 709/245 |
| 2002/0082858 A1 * | 6/2002 | Heddaya et al. ................ 705/1 |
| 2004/0148279 A1 * | 7/2004 | Peleg ............................ 707/3 |

* cited by examiner

Primary Examiner—Hiep T. Nguyen
(74) Attorney, Agent, or Firm—Sughrue Mion, PLLC

(57) ABSTRACT

A distributed shared file system (DSFS) comprising a network file system (NFS) capable of receiving at least a request from at least a client, a distributed cache, a metadata storage containing metadata information related to files stored in the NFS, a mapper capable of handling pointers to point to locations of data within the files and the metadata information, an agent capable of handling said request, and a relocator capable of relocating data within the NFS operative with said agent.

43 Claims, 5 Drawing Sheets

FLEXIBLE AND ADAPTIVE READ AND WRITE STORAGE SYSTEM ARCHITECTURE

I. DESCRIPTION

I. A. RELATED APPLICATIONS

The application claims priority from a co-pending U.S. Provisional Patent Application Ser. No. 60/356,770 filed Feb. 15, 2002, the contents of which are incorporated herein by reference.

I.B. FIELD

This disclosure teaches techniques generally related to distributed file systems and more specifically to distributed file systems used over highly scalable and massively parallel network systems.

I.C. BACKGROUND

1. References

The following U.S. patents and papers provide useful background information, for which they are incorporated herein by reference in their entirety.

a) Patents

| | | |
|---|---|---|
| 4,897,781 | January 1990 | Chang et al. |
| 5,113,519 | May 1992 | Johnson et al. |
| 5,163,131 | November 1992 | Row et al. |
| 5,355,453 | October 1994 | Row et al. |
| 5,594,918 | January 1997 | Knowles et al. |
| 5,644,751 | July 1997 | Burnett |
| 5,689,706 | November 1997 | Rao et al. |
| 5,802,366 | September 1998 | Row et al. |
| 5,835,942 | November 1998 | Putzolu |
| 5,893,140 | August 1999 | Vahalia et al. |
| 5,918,229 | June 1999 | Davis et al. |
| 5,931,918 | August 1999 | Row et al. |
| 5,963,963 | October 1999 | Schmuck et al. |
| 5,978,843 | November 1999 | Wu et al. |
| 6,061,720 | May 2000 | Kamel et al. |
| 6,119,151 | September 2000 | Cantrell et al. |
| 6,247,077 | June 2001 | Muller et al. |
| 6,260,040 | July 2001 | Kauffman et al. | b) Other References

"GPFS—General Parallel File System for the RS/6000 SP", IBM Almaden Research Center 2. Introduction Computers use network connectivity for sharing files that may be remotely located from the computer (node) that uses the files. The advantage of such a capability lies in the fact that files can be shared among users, seamlessly and in a transparent manner. However, a variety of issues need to be considered and overcome in order to ensure data coherency and consistency over the network. It is further required that a user computer is provided with fast acces to the files in the network. Also, such a network needs to be scalable to include a fresh addition of a large number of new nodes to the network.

A shared file system (SFS) is a conventional technique used for sharing files, or file objects, over a network. Such a SFS allows files to be shared between multiple users and attempts to manage the consistency and performance requirements in an efficient manner. One popular example of a shared file system, which is also a distributed system is GPSF (General Parallel File System) designed by International Business Machines for use in conjunction with its RS/6000 series of computers. Basically, it operates by connecting the application nodes through a network of switches to a plurality of storage nodes. Each storage node is further connected to pools of storage disks where data is stored. Every application node, specifically each client of such a node, may be provided with the permission to access files and file objects on every disk.

It is known that shared file systems provide important advantages to systems that require files to be accessed by two or more users. However, certain inherent risks are also present in such a network system. In addition, ensuring data integrity in a SFS is a challenge. Further, additional performance penalty results from using network resources to ensure such data integrity. Still further, files shared by multiple users are susceptible to accidental or willful corruption. This is partly due to the fact that more than a single user may modify or write to such a file or file object. In addition, users may modify files without knowing that others have also modified them previously or subsequently, thereby increasing the likelihood of file system failure.

GPFS, for example, like other conventional solutions, extensively uses a central file system manager to handle all system changes and SFS configuration. It also uses a single node to read and write configuration data. In addition, such a system frequently uses a variety of locking mechanisms that prevent two or more users from concurrently accessing a single file. Naturally, these requirements result in reduced performance due to the associated bottlenecks. This has become a more prevalent problem as the storage capacity of computer networks are increasing significantly. Also, this poses limits to the scalability of conventional SFS.

It would therefore be advantageous to provide a SFS that is capable of providing scalability over large computer networks that use significantly large storage capacity. It would be further advantageous if such systems were capable of providing a high level of performance including caching capabilities. It would be also advantageous if distributed caching capabilities are provided.

II. SUMMARY

To realize the advantages discussed above, the disclosed teachings provide a distributed shared file system (DSFS) comprising a network file system (NFS) capable of receiving at least a request from at least a client, a distributed cache, a metadata storage containing metadata information related to files stored in the NFS, a mapper capable of handling pointers to point to locations of data within the files and the metadata information, an agent capable of handling said request a relocator capable of relocating data within the NFS operative with said agent.

Another aspect of the disclosed teachings is a method for a write operation initiated by a client using a distributed shared file system (DSFS), wherein said method comprises receiving a write request from said client. Metadata attributes required for performing said write request are retrieved. Whether write operation is permitted is determined from the metadata. If write is not permitted a invalid notification is returned, otherwise continuing with the write operation. A log to non-volatile random access memory (NVRAM) is written. Portions of a distributed cache of said DSFS that related to previous versions of data involved in the write operation are invalidated. A remap is performed. Finally, completion of the write request is notified.

Yet another aspect of the disclosed teachings is a method for a read operation initiated by a client using a distributed shared file system (DSFS), wherein said method comprises receiving a read request from the client. Metadata attributes required for performing the read request are retrieved. It is determined if the client had permission to read based on said metadata attributes. If read is not permitted, an invalid notification is returned, otherwise getting the data respective of said read request.

Further enhancements to the above techniques are also part of the disclosed teachings.

III. BRIEF DESCRIPTION OF THE DRAWINGS

The above objectives and advantages of the disclosed teachings will become more apparent by describing in detail preferred embodiment thereof with reference to the attached drawings in which.

IV. DETAILED DESCRIPTION

Figure 1:
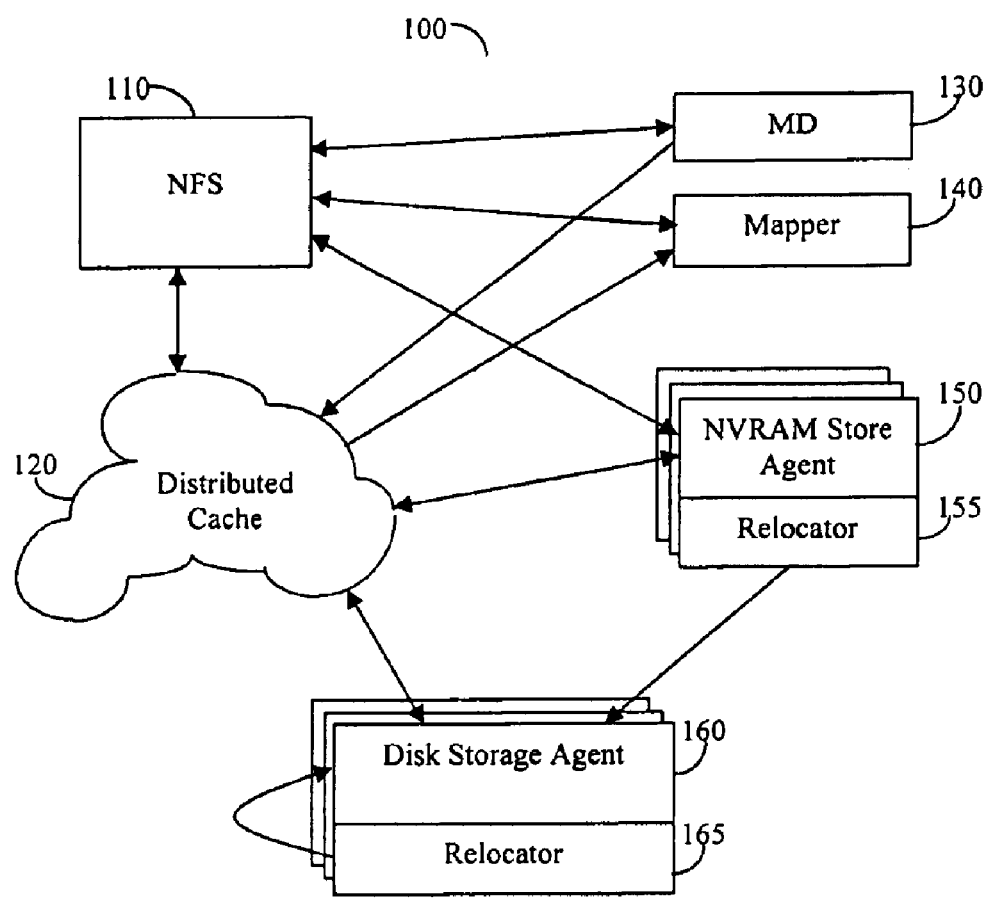
FIG. 1 illustrates an exemplary block diagram of the modules according a system embodying certain aspects of the disclosed teachings.

FIG. 1 shows an exemplary block diagram 100 of a shared distributed file system (DSFS) that embodies some aspects of the disclosed teachings. A network files system (NFS) 110 is responsible for receiving requests from a client and handling the interface with other components of the system 100. For retrieving data, NFS 110 interfaces with a distributed cache structure 120 that is explained in more detail below.

A detailed description of an exemplary distributed cache is described in PCT patent application number US01/19567, entitled "Scalable Distributed Hierarchical Cache" by Nir Peleg, assigned to common assignee and is herein by enclosed by reference for all that it contains.

NFS 110 further interfaces with metadata (MD) 130 where the metadata information, comprising objects related to a file, is located. The information from MD 130 is used to determine certain information about the file such as the file type, its permissions, ownership and data other then the content of the file. Mapper 140 is a location repository of data and metadata, i.e., it handles the pointers that point to the location of data or metadata within the context of the system. Mapper 140 is also the synchronization point for read-modify-write operations. The Mapper 140 is capable of supporting a variety of mapping schemes, and each mapping scheme may be uniquely used for each type of object.

Non-volatile random access memory (NVRAM) store agent 150 and its corresponding relocator 155 handle data that is located in a specific NVRAM. In a distributed system, there may be one or more such NVRAM units, which are usually comprised of some volatile random access memory (RAM) connected to an uninterruptible power supply (UPS) for the purpose of backup in case of a power failure. Disk storage agent 160 and its corresponding relocator 165 handle data located in a specific storage device, namely a storage disk or group of storage disks under a single control. In a distributed system, there may be one or more such storage device units.

The storage elements, whether NVRAM or disk based, are controlled by storage agents 150 and 160 respectively. Each of the storage elements is a non-distributed local repository for data and metadata, i.e., files and objects related to files. The storage agent 150 and storage agent 160 do not perform in-place writes, i.e., write operations are only logged rather then performed at the location where a write is intended.

This system provides for both typed of atomicity; i.e., no possibility of corruption during the write process because of a concurrent write operation by another user, as the entire write process is considered a single entity, as well as providing data protection. Moreover, since it does not require the use of any locking mechanism, the overall performance is improved. The storage agents 150 and 160 are further capable of supporting multiple storage and retrieval schemes. These include retrieval or storage based on byte ranges (from a specific byte location to another specific byte location), hash tables, skip lists and the like.

Relocators 155 and 165 are responsible for moving data and metadata between storage elements or within storage elements. For example, as space on a NVRAM storage unit may be scarce, it may be desirable to move infrequently used data to disk storage rather then occupy expensive NVRAM space. Similarly, it may be desirable to move data from one disk storage element to another disk storage element. For example, it may be desirable to move some specific data that is intensively used by a user to a storage disk that has a faster access time or provides a better overall latency for access.

Relocation is performed transparent to the users. Also, it is performed off-line from the user. Detailed discussions on the ways to relocate data or metadata in real-time is disclosed in U.S. patent application Ser. No. 10/201,594 entitled "A Method and Computer Software for Real-Time Network Configuration" and U.S. patent application Ser. No. 10/201,599 entitled "Real-Time Reconfiguration of Computer Networks Based on System Measurements", assigned to common assignee and are included herein by reference for all that they contain.

Figure 2:
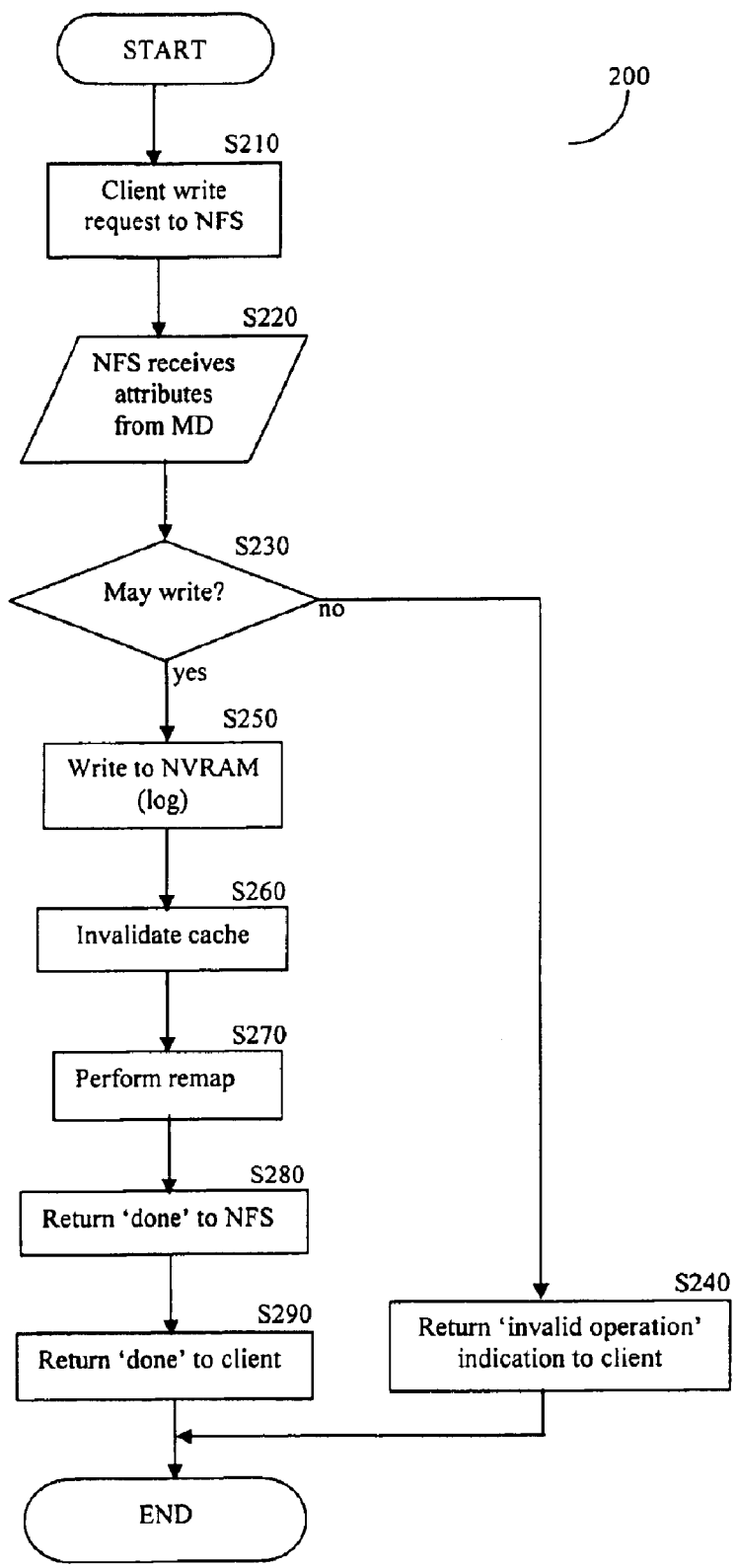
FIG. 2 illustrates an exemplary flowchart for a write operation embodying certain aspects of the disclosed teachings.

FIG. 2 shows an exemplary flowchart 200 describing the step-by-step operation leading to a write operation related to the disclosed DSFS. In step 210, a client computer sends to the NFS 110 a request to perform a write operation on a file. In step 220, NFS 110 checks MD 130 for the attributes of the file. Such attributes are part of the metadata related to the file to be used in connection with the write request. In step 230, metadata parameters are checked to determine if the client has permission to write data to the file and access or change the metadata. If such write is not permitted then, in step 240, the client receives a return message notification describing the reason or reasons for not executing the write request.

If, in step 230, it was determined that write is permissible, then in step 250, the write is performed into NVRAM by NVRAM storage agent 150. Specifically, the write is logged in the NVRAM as no in-place write is performed. It should be clear that the logged in data is transferred to an appropriate storage location using the Relocation techniques referred to earlier in this disclosure.

The data in distributed cache 120 is invalidated in step 250 to ensure that a future read receives the most current data. It is then necessary to perform a remap in step 260. This is done in order to resolve potential write conflicts; however, it does not require a locking mechanism. This is performed by mapper 140 by assigning a view identification to the newly written data. This view identification is explained in detail in U.S. patent application Ser. No. 10/201,594 entitled "A Method and Computer Software for Real-Time Network Configuration", assigned to common assignee and is included herein by reference for all that it contains. In step 280 and step 290 a 'done' indication is returned from NVRAM store agent 150 to NFS 110 and to client, respectively.

Figure 3:
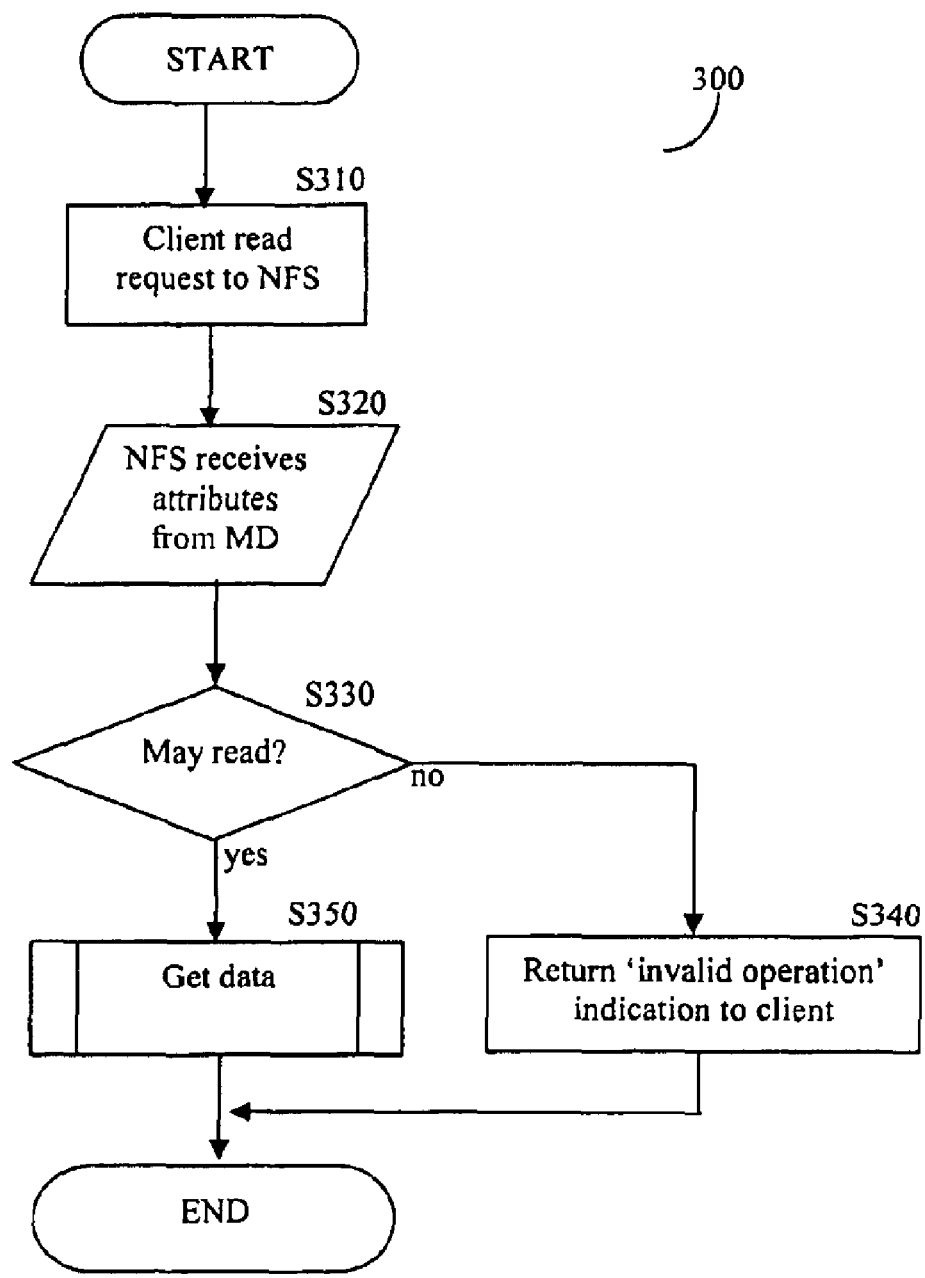
FIG. 3 illustrates an exemplary flowchart for a read operation embodying certain aspects of the disclosed teachings.

FIG. 3 shows an exemplary flowchart 300 describing the step-by-step operation leading to a read operation related to the disclosed DSFS. In step 310, a client sends NFS 110 a request to perform a read operation from a file. In step 320, NFS 110 checks MD 130 for attributes related to the file.

Such attributes are part of the metadata related to the file to be used in connection with the read request. In step 330, metadata parameters are checked and it is determined if the client may read the requested data or related metadata. If such read is not permitted, then in step 340, the client receives a return message notification describing the reason or reasons for not executing the read request. If, in step 330, it is determined that a read request is permissible, then in step 350, the data is requested from distributed cache 120. A detailed description of the operation leading to receiving the read data is described below.

Figure 4:
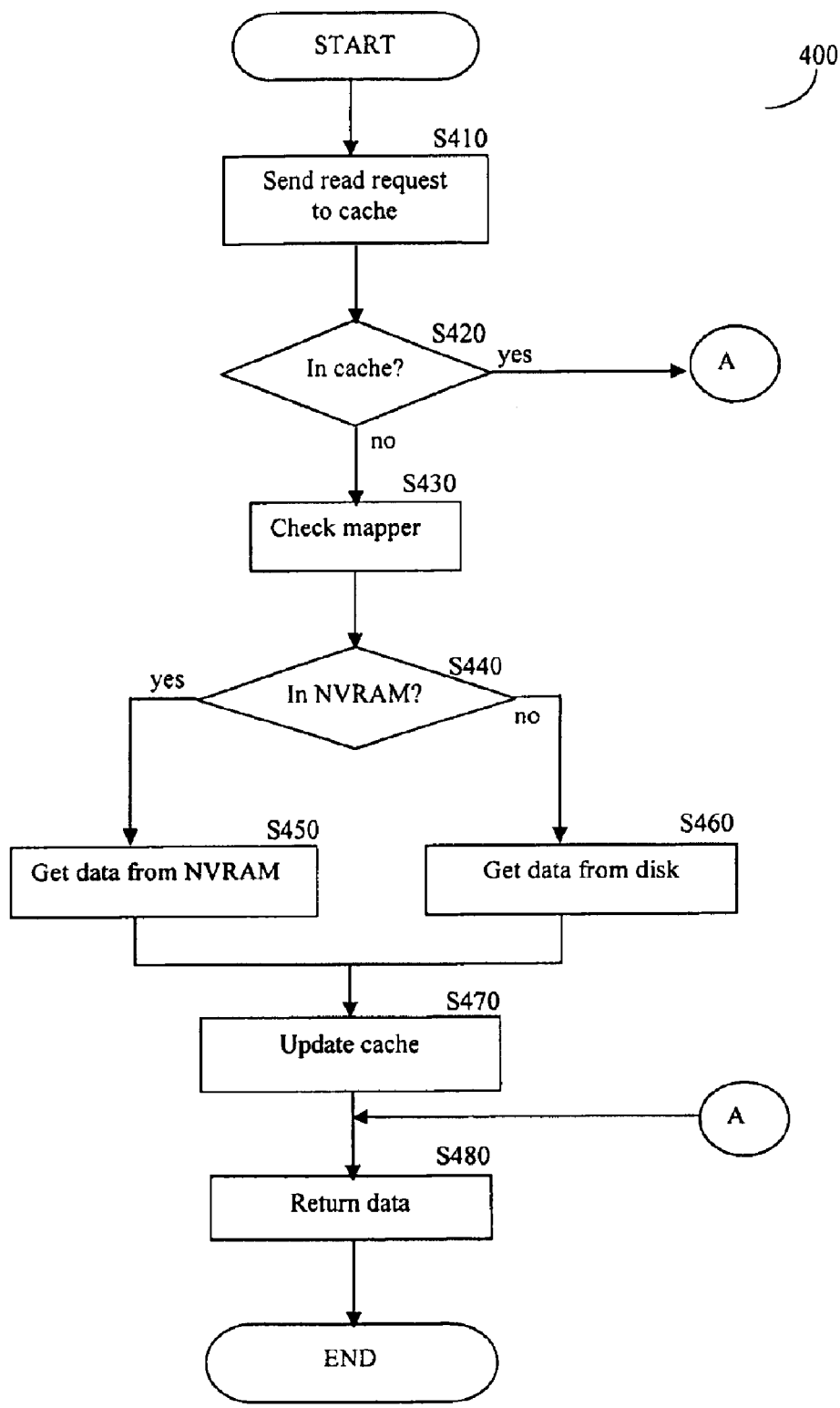
FIG. 4 illustrates an exemplary flowchart for accessing a distributed cache, NVRAM and storage disk embodying certain aspects of the disclosed teachings.

FIG. 4 shows an exemplary flowchart 400 that describes the steps performed as a result of step 350 described in FIG. 3. In step 410 the request is sent to cache 120 and if it is determined in step 420 that the data is in cache 120, then execution continues with step 480 where data is returned to NFS 110, which in turn returns the data to the requesting client. If, in step 420, it is determined that the data is not in cache 120, then mapper 140 is checked in step 430. If in step 440 it is determined, based on the mapper 140 information, that the data is in NVRAM, then in step 450 NVRAM storage agent 150 is accessed for the purpose of retrieving the requested data. If in step 440 it is determined, based on the mapper 140 information, that the data is on disk, then in step 460 disk storage agent 160 is accessed for the purpose of retrieving the requested data. Regardless of the data source, NVRAM or disk, cache 120 is updated with the data retrieved in step 470. In step 480 the data is returned to NFS 110, which in turn returns the data to the requesting client.

Figure 5:
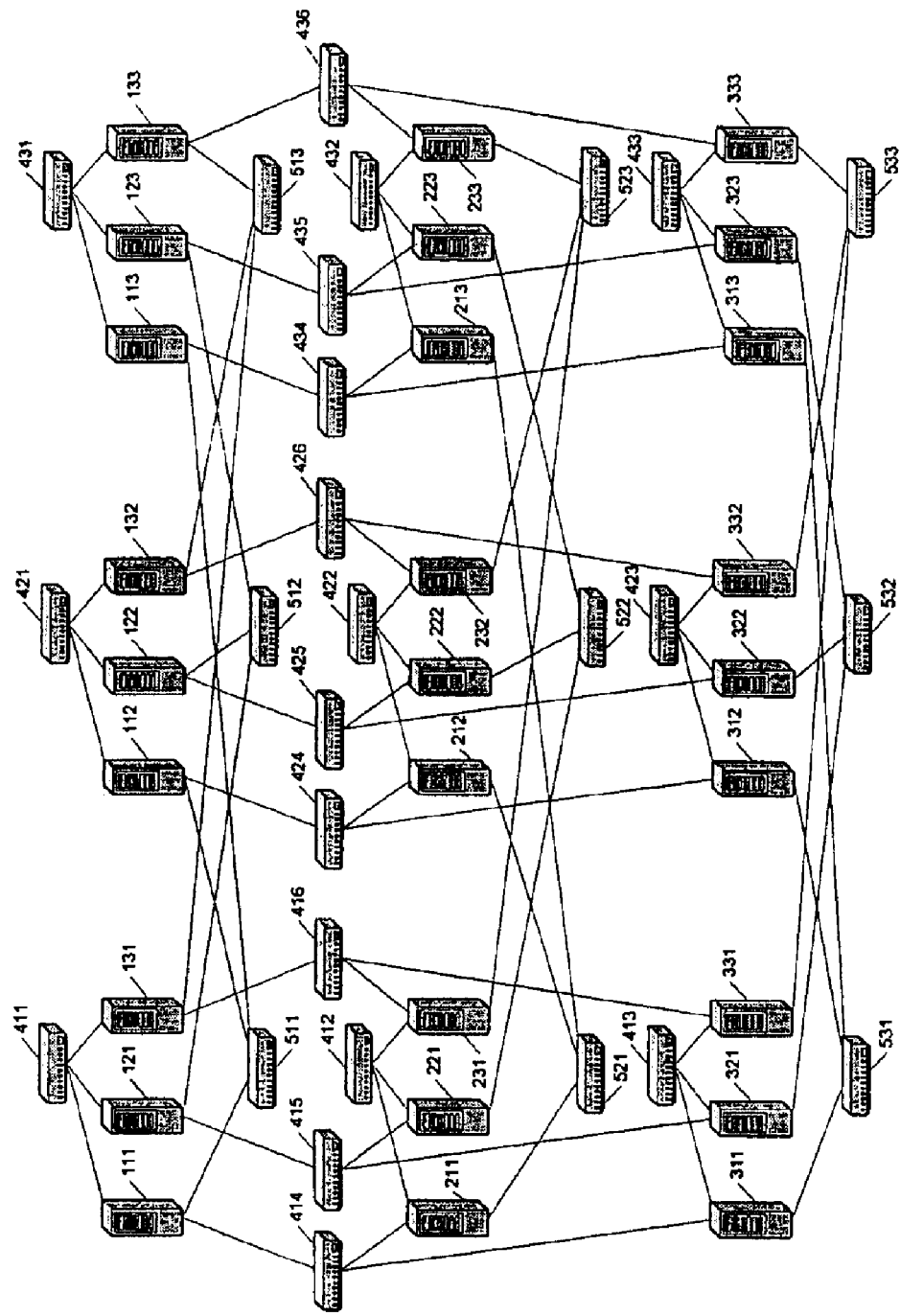
FIG. 5 illustrates an exemplary scalable hyper-mesh network system embodying certain aspects of the disclosed teachings.

FIG. 5 shows a distributed computer system which is disclosed in PCT patent application PCT/US00/34258, entitled "Interconnect Topology for a Scalable Distributed Computer System" assigned to common assignee and which is hereby incorporated by reference for all that it discloses. The disclosed techniques could be easily adapted to provide for the system's capability to have redundant copies of files and make the most current view available and ensure that current views have at least a redundant identical view in the system. A fully populated dimension 3 network topology may use the principles of the invention described herein above. The network topology is comprised of a plurality of network switches and a plurality of independent processors. For this particular network topology, there are twenty-seven independent network node locations (111, 112, 113, 121, 122, 123, 131, 132, 133, 211, 212, 213, 221, 222, 223, 231, 232, 233, 311, 312, 313, 321, 322, 323, 331, 332, 333). Each network node location in the network is connected to three other network node locations. A plurality of inter-dimensional switches of width d=3 (not shown) and a plurality of intra-dimensional switches of width w=3 (411, 412, 413, 414, 415, 416, 421, 422, 423, 424, 425, 426, 431, 432, 433, 434, 435, 436, 511, 512, 513, 521, 522, 523, 531, 532, 533) interconnect the processors located at the network node locations. As used herein, the term "width" refers to the number of available ports on either an inter-dimensional switch or an intra-dimensional switch.

For the fully populated dimension 3 network, each processor located at a network node location is connected to three intra-dimensional switches. The inter-dimensional switch connected to the processor effects the connection to the intra-dimensional switch. For example, consider the processors located at network node location 111, network node location 121 and network node location 131. These processors are connected to an intra-dimensional switch 411. The processor at network node location 111 is also connected to processors located at network node location 211 and at network node location 311 through another intra-dimensional switch 414. Finally, the processor located at network node location 111 is connected to the processor at network node location 112 and the processor at network node location 113 through intra-dimensional switch 511.

The system described in FIG. 5 is highly scalable and is an exemplary system for the implementation of both distributed caches as well as DSFS implemented in accordance with the disclosed teachings. Specifically, write latency results predominately from interconnect as disk accesses are done off-line, as write in-place is not performed and otherwise unnecessary. Moreover, no locking is required and therefore the system continues to perform at the maximum speed regardless of the type of write performed. Similarly read latency is mostly dependent on NVRAM and cache effectiveness as recently written data can be fetched from NVRAM and frequently read data resides in the cache. It should be further noted that relocation of data is done transparently to the read and write operations of the system allowing for improved performance as the system monitors and detects, over time, more effective places to store data. It should be further noted that bandwidth per node is constant due to the ability to upscale interconnectivity.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A distributed shared file system (DSFS) comprising:
   a network file system (NFS) capable of receiving at least a request from at least a client;
   a distributed cache;
   a metadata storage containing metadata information related to files stored in the NFS;
   a mapper capable of handling pointers to point to locations of data within the files and the metadata information;
   an agent capable of handling said request; and
   a relocator capable of relocating data within the NFS operative with said agent.

2. The DSFS of claim 1, wherein said distributed cache is capable of communicating with said NFS, said metadata storage, said mapper, and said agent.

3. The DSFS of claim 1, wherein said NFS is capable of communicating with said distributed cache, said metadata storage, and said mapper.

4. The DSFS of claim 1, wherein said agent is one of a non-volatile random access memory (NVRAM) storage agent and a disk storage agent.

5. The DSFS of claim 4, wherein said NFS is further capable of communicating with the NVRAM store agent whenever the agent is an NVRAM storage agent.

6. The DSFS of claim 1, wherein said metadata comprises at least an object related to a file stored in said DSFS.

7. The DSFS of claim 6, wherein the object is one of file properties, file permissions, file history and file type.

8. The DSFS of claim 7, wherein the file permissions comprise one of read, write and execution permission.

9. The DSFS of claim 7, wherein said file history comprises one of creation date, modification date, creator, modifier of said file, and location history.

10. The DSFS of claim 7, wherein said file type comprises one of text, executable, image, archive, driver, sound, and video.

11. The DSFS of claim 1, wherein said mapper is a location depository.

12. The DSFS of claim 11, wherein said location depository comprises at least one pointer pointing to an object related to said DSFS.

13. The DSFS of claim 12, wherein the object is one of data and metadata.

14. The DSFS of claim 12, wherein said mapper is further capable of mapping each type of object using a unique mapping scheme.

15. The DSFS of claim 11, wherein said mapper is involved in synchronization of read-modify-write operations.

16. The DSFS of claim 4, wherein said NVRAM store agent handles data located on a specific NVRAM.

17. The DSFS of claim 16, wherein said NVRAM further comprises at least volatile random access memory (RAM) connected to an uninterruptible power supply (UPS).

18. The DSFS of claim 16, wherein said relocator associated with said NVRAM store agent is capable of relocating files from said RAM to a disk by communicating with said disk storage agent.

19. The DSFS of claim 4, wherein said disk storage agent handles data located in a specific storage device.

20. The DSFS of claim 19, wherein said specific storage device is one of a single disk and a group of disks.

21. The DSFS of claim 1, wherein said agent does not perform in-place writes.

22. The DSFS of claim 1, wherein write operations are logged but not actually performed.

23. The DSFS of claim 1, wherein said agent is further capable of supporting a storage and retrieval scheme selected from a group of byte range, hash table and skip list.

24. The DSFS of claim 14, wherein said relocator associated with said NVRAM agent is further capable of performing relocation of an object within an NVRAM.

25. The DSFS of claim 14, wherein said relocator associated with said NVRAM agent is further capable of performing relocation of an object between independent NVRAMs.

26. The DSFS of claim 14, wherein said relocator associated with said NVRAM agent is further capable of performing relocation of an object from an NVRAM to a disk storage.

27. The DSFS of claim 24, wherein said relocator moves an object for at least one of freeing up NVRAM space and balancing system load.

28. The DSFS of claim 14, wherein said relocator associated with said disk storage agent is further capable of performing relocation of an object within a storage device.

29. The DSFS of claim 14, wherein said relocator associated with said disk storage agent is further capable of performing relocation of an object between independent storage devices.

30. The DSFS of claim 28, wherein said relocator moves an object for the purpose of freeing up disk space, providing faster access time or balancing system load.

31. The DSFS of claim 1, wherein said relocator operation is transparent to said client.

32. The DSFS of claim 1, wherein said request received by said NFS is one of a read request and a write request.

33. The DSFS of claim 32, wherein in response to receipt of said read request the DFSF is capable of retrieving metadata attributes respective of said read request to determine whether read is permitted and returning an invalid notification if read is not permitted and getting the data respective of said read request.

34. A method for a write operation initiated by a client using a distributed shared file system (DSFS), wherein said method comprises:
    a) receiving a write request from said client;
    b) retrieving metadata attributes required for performing said write request;
    c) determining from the metadata if write operation is permitted.
    d) if write is not permitted returning a invalid notification, otherwise continuing with the write operation;
    e) writing a log to non-volatile random access memory (NVRAM);
    f) invalidating portions of a distributed cache of said DSFS that related to previous versions of data involved in the write operation;
    g) performing a remap; and
    h) notifying completion of said write request.

35. The method of claim 34, wherein said metadata attributes include at least file access permissions.

36. The method of claim 35, wherein said file access permission includes one of read, write, read-modify-write, execute, delete and create.

37. The method of claim 34, wherein said writing a log is performed in place of an in-place write operation.

38. The method of claim 34, wherein said remap is performed for resolving consecutive write requests.

39. The method of claim 34, wherein said remap does not require use of a locking mechanism.

40. The method of claim 39, wherein said remap includes assignment of a view identification.

41. The method of claim 40, wherein said view identification is updated each time data is changed.

42. The method of claim 41, wherein said view identification is part of the metadata parameters associated with a file.

43. A method for a read operation initiated by a client using a distributed shared file system (DSFS), wherein said method comprises:
    a) receiving a read request from the client;
    b) retrieving metadata attributes required for performing the read request;
    c) determining if the client had permission to read based on said metadata attributes;
    d) if read is not permitted returning a invalid notification, otherwise getting the data respective of said read request, wherein said getting the data respective of said read request comprises the steps of:
        d1 sending a read request to a distributed cache;
        d2 returning the data if said data is found in said distributed cache, otherwise continuing with step d3;
        d3 checking mapper;
        d4 getting the data from non-volatile random access memory (NVRAM) if located in NVRAM, otherwise getting the data from disk;
        d5 updating said distributed cache with the data; and
        d6 returning the data to said client.

* * * * *